United States Patent [19]

Harvey

[11] Patent Number: 4,600,285

[45] Date of Patent: Jul. 15, 1986

[54] OVEREXTENDED LEADER POSITIONING MECHANISM

[75] Inventor: Frederick W. Harvey, Webster, N.Y.

[73] Assignee: Eastman Kodak Company, Rochester, N.Y.

[21] Appl. No.: 685,562

[22] Filed: Dec. 24, 1984

[51] Int. Cl.⁴ ............................................. G03B 35/00
[52] U.S. Cl. ..................................... 354/212; 354/288
[58] Field of Search ................. 354/202, 288, 212–216

[56] References Cited

U.S. PATENT DOCUMENTS

| | | | |
|---|---|---|---|
| 3,387,546 | 6/1968 | Winkler et al. | 95/31 |
| 3,433,143 | 3/1969 | Lieser et al. | 354/212 |
| 3,470,801 | 10/1969 | Lieser et al. | 354/214 |
| 4,303,325 | 12/1981 | Seely | 354/212 |
| 4,411,509 | 10/1983 | Shirai | 354/212 |
| 4,459,000 | 7/1984 | Sekine et al. | 354/211 |
| 4,477,162 | 10/1984 | Matsumoto | 354/212 X |

Primary Examiner—L. T. Hix
Assistant Examiner—Brian W. Brown
Attorney, Agent, or Firm—Roger A. Fields

[57] ABSTRACT

A film cartridge having a light-trapped slit from which a film leader protrudes is positioned in a photographic camera with the leader pointing towards a film take-up chamber in the camera. Enough of the leader is drawn out of the cartridge to reach a film take-up spool rotatably supported in the take-up chamber. Then, a leading end portion of the leader is placed in the take-up chamber in contact with the take-up spool to enable automatic engagement with the spool. If the leading end portion of the leader reaches beyond the take-up chamber, either because too much of the leader was drawn out of the cartridge or because the leader was too long originally, closing movement of the camera back causes a positioning member mounted on the back to insert the leading end portion into the take-up chamber and to press such end portion against the take-up spool.

8 Claims, 6 Drawing Figures

OVEREXTENDED LEADER POSITIONING MECHANISM

BACKGROUND OF THE INVENTION

1. Field of the Invention

The invention relates generally to photographic cameras, and particularly to improved film loading apparatus in a 35 mm camera. More specifically, the invention relates to loading apparatus in a 35 mm camera for correctly positioning a film leader for take-up in the camera whenever the leader is overextended (within a reasonable limit) from the film cartridge.

2. Description of the Prior Art

Typically, in 35 mm photography, the film is supplied in light-tight cartridges ready for loading into the camera. The cartridges are of simple construction including a rotatably supported spool on which the film is wound and a velvet or plush-lined, light-trapped slit from which protrudes a film leader of a predetermined length, e.g., 2≃ in. To load the cartridge into the camera, the cartridge is positioned in a cartridge receiving chamber in the camera body with the leader pointing towards a film take-up chamber in the camera body. Then, enough of the film leader, e.g. another ¼ in., is drawn out of the cartridge to reach a film take-up spool rotatably supported in the take-up chamber, and the leading end portion of the leader is placed in the take-up chamber for engagement with the take-up spool. The engagement is effected manually in some cameras, such as the Olympus OM-10, and automatically in other cameras, such as the Fujica DL-20. After the camera back is closed, the fogged section of the film is wound onto the take-up spool by rotating the spool to advance the film two or three frames.

Though the predetermined length of the film leader protruding from the cartridge varies from manufacturer to manufacturer, usually such length is not long enough for the leading end portion of the leader to be located beyond the take-up chamber when the cartridge is positioned in the cartridge receiving chamber. If the film leader is too long, however, and extends beyond the take-up chamber, for example, because the operator has pulled too much of the film from the cartridge or because the leader was too long originally, then the cartridge must be removed from the cartridge receiving chamber, and the film must be rewound into the cartridge by rotating the film spool located in the cartridge. This is not a good solution to the problem of an overextended leader, since the leading end portion of the leader may accidentally be rewound into the cartridge, in which case the leader cannot be retrieved without destroying the light trap on the cartridge.

Recently, the problem of an overextended leader has been addressed to some degree, as indicated in U.S. Pat. No. 4,459,000, granted July 10, 1984, by film cutting means in the camera. The cutting means is a scissors including one blade fixed on the camera body and the other blade having respective ends pivotally connected to the first blade and to the camera back. The blade connected to the camera back is actuated in response to closing movement of the camera back to cut off whatever portion of the leader extends beyond the take-up chamber, leaving a length of the leader that is suitable for automatic engagement with the take-up spool. Such cutting means is disadvantageous, however, in that it will dull with use until it can no longer cut the film leader.

SUMMARY OF THE INVENTION

The invention provides an improved solution to the above-described problem of an overextended film leader. In particular, the invention correctly positions the film leader for take-up in the camera whenever the leader is overextended (within a reasonable limit) from the film cartridge. This is done without having to rewind the leader into the cartridge or to cut the leader to shorten it as in the prior art.

In keeping with the teachings of the invention, there is provided, in a photographic camera of the type wherein (a) a cartridge receiving chamber in the camera body receives a film cartridge having a light-trapped slit from which an inherently curled film leader protrudes and (b) a film take-up chamber in the camera body receives a leading end portion of the leader to take-up the film from the cartridge, the improvement comprising:

a camera back supported for movement with respect to the camera body to open and close the cartridge chamber and the take-up chamber; and positioning means, mounted on the camera back and operating in response to closing movement of the back, for forcing a film leader extended beyond the take-up chamber to bow in the direction of its inherent curl and be inserted leading end portion first into the take-up chamber.

According to a preferred embodiment of the invention, a film take-up spool is rotatably supported in the take-up chamber for winding the film from the cartridge into the take-up chamber after each exposure. The positioning means includes a resiliently flexible, elongate positioning member which is bowed to conform with the curvature of the take-up spool and extends between respective locations in the take-up chamber and beyond such chamber when the camera back is opened sufficiently for the cartridge chamber to receive the cartridge. As the camera back is closed, the positioning member catches the overextended leader and inserts it into the take-up chamber, pressing the leader against the take-up spool for automatic engagement with the spool.

BRIEF DESCRIPTION OF THE DRAWINGS

The invention will be described in connection with the drawings, wherein.

DESCRIPTION OF THE PREFERRED EMBODIMENT

The invention is described as being embodied in a 35 mm camera. Because such photographic cameras are well known, this description is directed in particular to camera elements forming part of or cooperating directly with the preferred embodiment. It is to be understood, however, that camera elements not specifically shown or described may take various forms known to persons of ordinary skill in the art.

Figure 1:
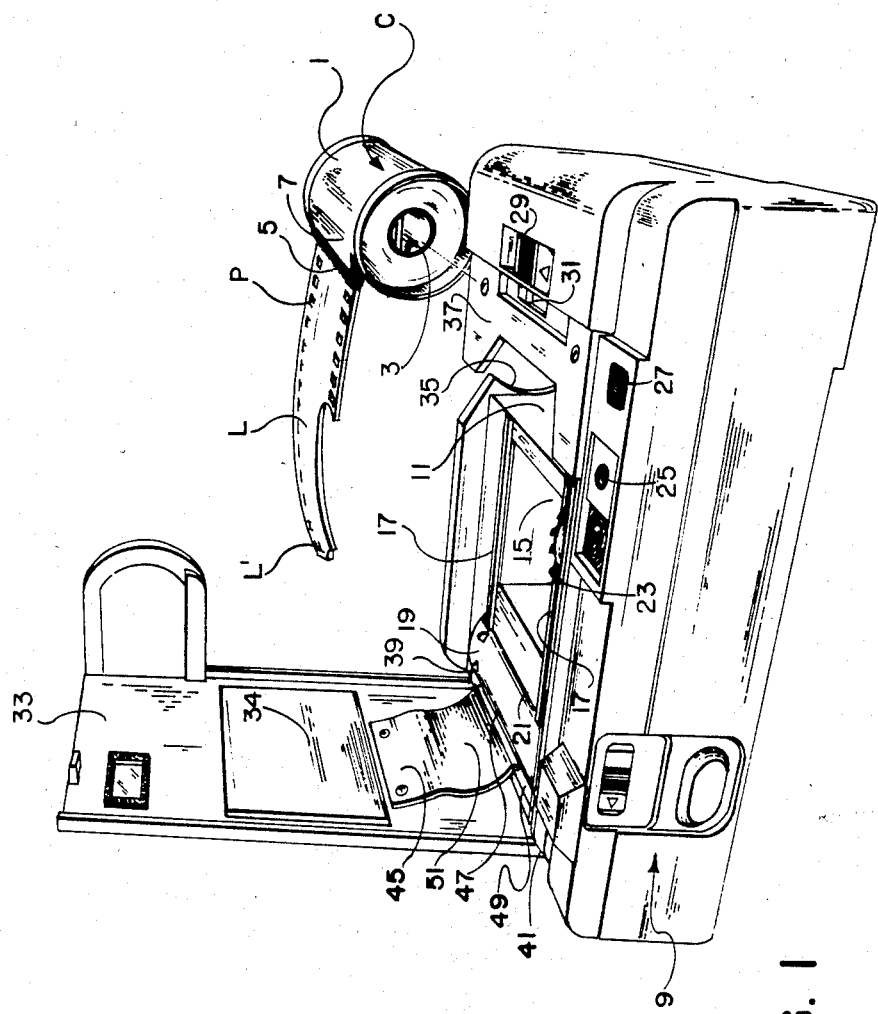
FIG. 1 is a perspective view of a photographic camera provided with an overextended leader positioning mechanism in accordance with a preferred embodiment of the invention, viewing the camera from its top and its back with the back opened to receive a film cartridge with an overextended film leader.

Referring now to the drawings, and in particular to FIG. 1, a bottom loaded 35 mm camera is shown in an opened position for receiving a known 35 mm film cartridge C, such as manufactured by Eastman Kodak Company. The cartridge C comprises a light-tight film container 1 housing a rotatably supported spool 3 on which is wound an edge-perforated 35 mm film roll. A film leader L longitudinally protrudes from a plush-lined, light-trapped slit 5 in a throat portion 7 of the container 1. The film leader L protrudes a predetermined length, e.g. $2\chi$ in., from the slit 5 and, originally, is curled about the container 1.

Figure 2:
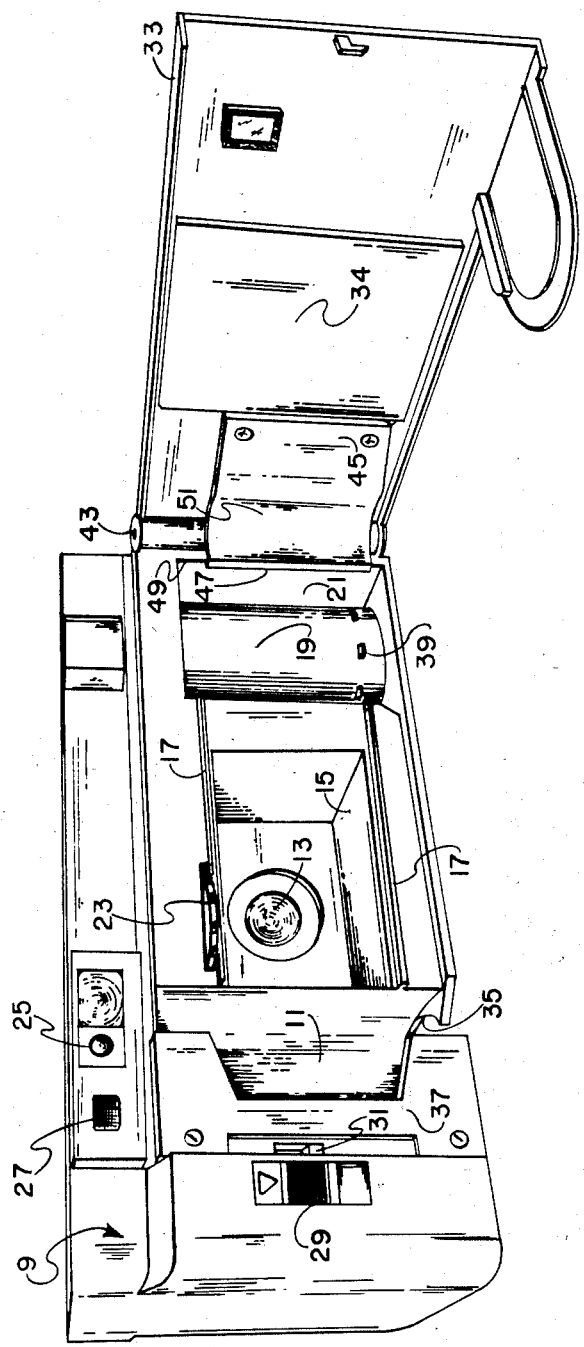
FIG. 2 is a perspective view of the camera, viewing the camera in an erect position with its back opened.
Figure 3:
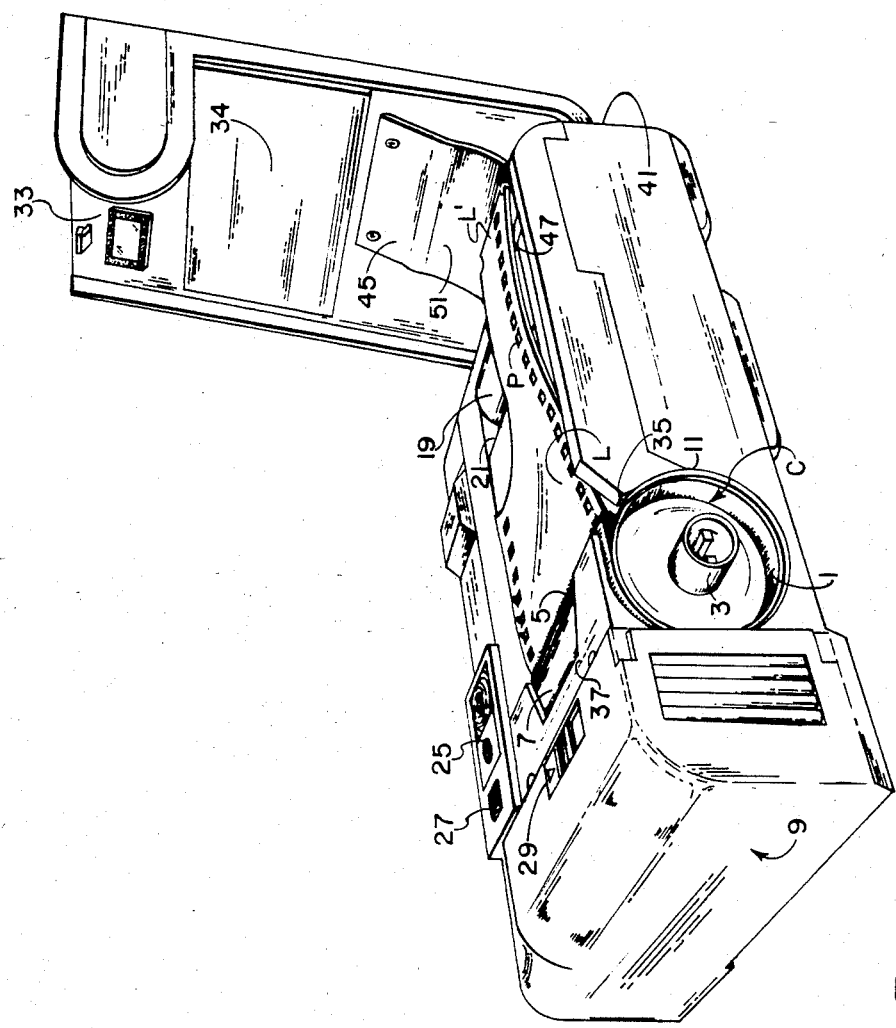
FIG. 3 is a perspective view of the camera, viewing the camera from its bottom and its back with the cartridge and the overextended leader received in the camera.

The 35 mm camera, in accordance with a preferred embodiment of the invention, as shown in FIGS. 1–3, comprises a camera body 9 in which is provided a number of conventional elements, such as a cartridge receiving chamber 11; a picture-taking lens 13 arranged within a film exposure window 15; a pair of substantially parallel film rails 17; a film take-up spool 19 rotatably supported within a film take-up chamber 21; a film advance indicator sprocket 23 connected to a film advance indicator 25; a flash energization indicator 27 for a built-in electronic flash, not shown; a manually operated release lever 29 connected to a latch 31 for securing a camera back 33 closed; and a film pressure plate 34 spring-supported on the camera back for holding successive film sections on the film rails during film exposure at the exposure window. The cartridge receiving chamber 11 has a bottom opening 35 for receiving the film cartridge C endwise, i.e., axially, in the chamber. During loading, the cartridge C is positioned in the cartridge receiving chamber 11 with the slit 5 in the throat portion 7 of the cartridge pointing towards the take-up chamber 21 and the film leader L extending generally along the two spaced rails 17. A plate member 37 fixed to the camera body 9 partially encloses the cartridge receiving chamber 11 to facilitate loading of the cartridge C into such chamber in the correct orientation and to prevent the cartridge from falling laterally out of the chamber. Usually, the predetermined length, e.g. $2\frac{7}{8}$ in., of the film leader L protruding from the cartridge C is not long enough for its leading end portion L' to reach the take-up spool 19 in the take-up chamber 21. Consequently, the operator must draw a sufficient length, e.g., another $\frac{1}{4}$ in., of the leader L out of the cartridge C to enable its leading end portion L' to fall into the take-up chamber 21 and to come to rest against the take-up spool 19. The take-up spool 19 includes a plurality of attachment teeth 39 for engaging the leader L at its perforations P in response to rotation of the spool by motorized means, not shown, after the camera back 33 is closed. As shown in FIG. 2, the camera back 33 is supported for opening and closing movement on the camera body 9 at an end portion 41 of the camera body proximate the take-up chamber 21. In operation, the camera back 33 is pivoted about a coupling pin 43 which extends substantially parallel to the rotational axis of the take-up spool 19.

Figure 4:
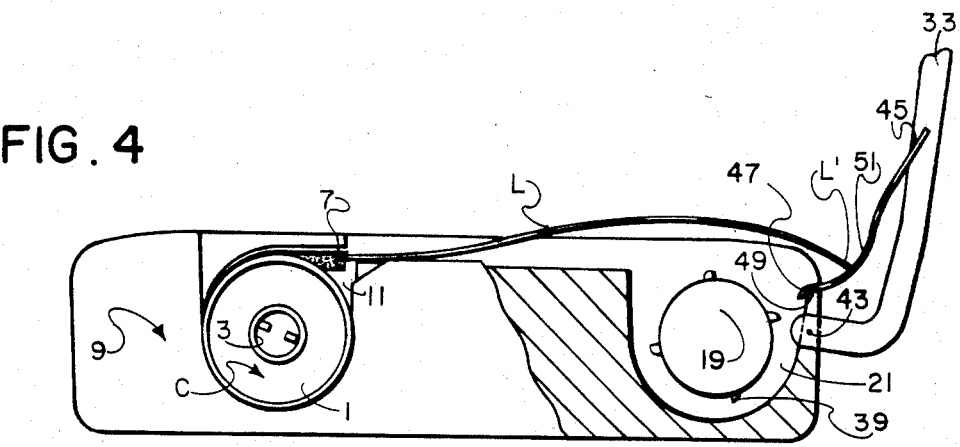
FIGS. 4, 5, and 6 are partial bottom elevational views of the camera, depicting operation of the positioning mechanism.
Figure 5:
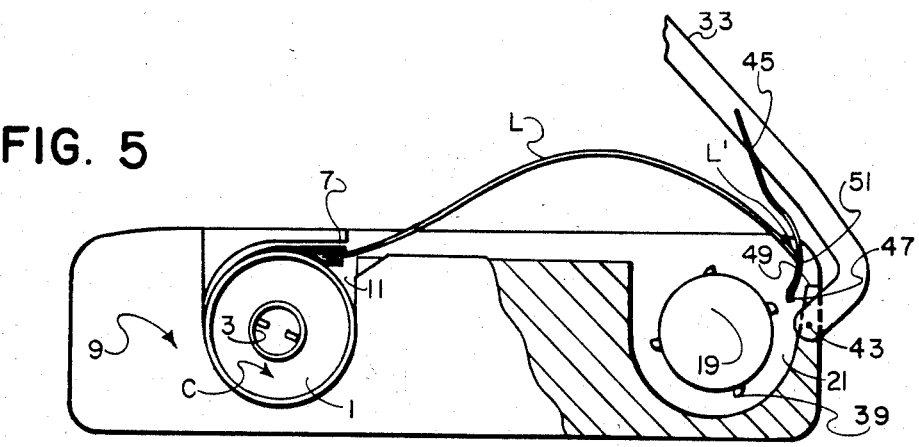
Figure 6:
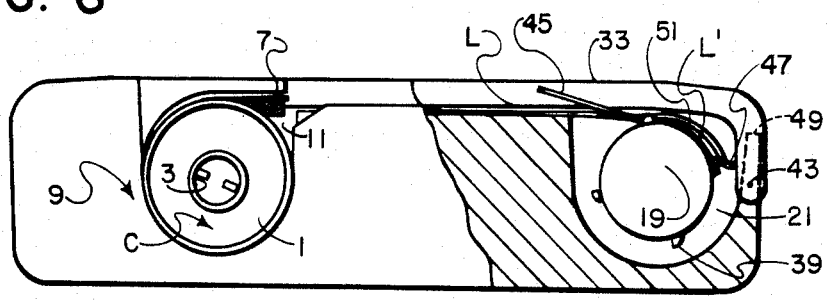

If the leading end portion L' of the film leader L is too long and reaches beyond the take-up chamber 21, as shown in FIGS. 3 and 4, either because too much of the leader was drawn out of the cartridge C or because the leader was too long originally, a resiliently flexible positioning member 45, mounted on the camera back 33, inserts the leading end portion of such overextended leader into the take-up chamber and presses the end portion against the take-up spool 19, in response to closing movement of the camera back. When the camera back 33 is opened sufficiently, as shown in FIG. 4, to load the cartridge C into the cartridge receiving chamber 11, a free end portion 47 of the positioning member 45 is moved onto a plateau 49 on the camera body 9 to thereby prevent further opening of the camera back. At this time, the free end portion 47 of the positioning member 45 extends slightly into the take-up chamber 21, as shown in FIG. 4, and an intermediate portion 51 of the positioning member is located beyond the take-up chamber to catch the leading end portion L' of the overextended leader L. Then, as the camera back 33 is closed, the positioning member 45 is moved in an arc into the take-up chamber 21, forcing the film leader L to bow in the direction of its inherent curl, as shown in FIG. 5. The bowing of the leader L and the change of position of the positioning member 45 cause the leading end portion L' of the leader to slip off the free end portion 47 of the positioning member and into the take-up chamber 21 at a location between the take-up spool 19 and the plateau 49 on the camera body 9. Finally, as closing movement of the camera back 33 is substantially completed, as shown in FIG. 6, the intermediate portion 51 of the positioning member 45 is moved against the leader L, pressing the leader against the take-up spool 19. The intermediate portion 51 is bowed to conform with the curvature of the take-up spool 19, to wrap the leader L partially around the spool for engagement by the teeth 39 on the spool when the spool is first rotated.

While the invention has been described with reference to a preferred embodiment, it will be understood that various modifications may be effected within the ordinary skill in the art without departing from the scope of the invention.

I claim:

1. In a photographic camera of the type wherein (a) a cartridge receiving chamber is provided in the camera body to receive a film cartridge having a light-trapped slit from which an inherently curled film leader protrudes and (b) a film take-up chamber is provided in the camera body for receiving a leading end portion of the leader to take up the film from the cartridge, the improvement comprising:

a camera back supported for movement with respect to said camera body to close said cartridge chamber and said take-up chamber; and positioning means, mounted on said camera back and operating in response to closing movement of the back, for forcing a film leader extended beyond said take-up chamber to bow in the direction of its inherent curl and be inserted leading end portion first into the take-up chamber.

2. The improvement as recited in claim 1, wherein said camera back is supported for movement to open said cartridge chamber and said take-up chamber, and said positioning means includes a positioning member having a first portion shaped to engage said camera body to prevent further opening of said camera back when said camera back is opened sufficiently for said cartridge chamber to receive the film cartridge and a second portion shaped to extend to a location beyond said take-up chamber to catch the leading end portion of the leader when said engaging means engages said camera body.

3. The improvement as recited in claim 2, wherein said camera back is supported on said camera body at a location beyond said take-up chamber for opening and closing movement about a pivot axis substantially parallel to the take-up chamber, and said positioning member is arranged with respect to said camera back for progressive insertion into said take-up chamber during closing movement of the camera back.

4. In a photographic camera of the type wherein (a) a cartridge receiving chamber is provided in the camera body to receive a film cartridge having a light-trapped slit from which an inherently curled film leader protrudes, (b) a film take-up chamber is provided in the camera body for receiving a leading end portion of the leader, and (c) a film take-up spool is provided in said take-up chamber to which the leading end portion of the leader is automatically secured for winding the film into the take-up chamber, the improvement comprising:

a camera back supported on said camera body at an end section of the camera body proximate said take-up chamber for movement about a pivot axis substantially parallel to said take-up chamber to close said cartridge and take-up chambers; and positioning means, mounted on said camera back and operating in the event the leading end portion of the film leader extends beyond said take-up chamber, for forcing such overextended leader to bow in the direction of its inherent curl and be inserted leading end portion first into the take-up chamber in response to closing movement of the camera back, whereby the leading end portion may be secured to said take-up spool.

5. The improvement as recited in claim 4, wherein said positioning means includes a resiliently flexible positioning member connected to said camera back and shaped to press the leading end portion of the overextended leader against said take-up spool by flexing against the spool as closing movement of the camera back is substantially completed.

6. The improvement as recited in claim 5, wherein said positioning member is bowed to conform with the curvature of said take-up spool.

7. The improvement as recited in claim 4, wherein said positioning means includes a positioning member shaped to catch the leading end portion of the overextended leader.

8. In a photographic camera of the type wherein (a) a cartridge receiving chamber is provided in the camera body to receive a film cartridge having a light-trapped slit from which an inherently curled film leader protrudes and (b) a film take-up chamber is provided in the camera body for receiving a leading end portion of the leader to take-up the film from the cartridge, the improvement comprising:

a camera back supported for movement with respect to said camera body to open and close said cartridge chamber and said take-up chamber; and positioning means, mounted on said camera back and operating in the event the leading end portion of the film leader extends beyond said take-up chamber, for catching the leading end portion of such overextended leader when the camera back is opened sufficiently for said cartridge chamber to receive the cartridge, and for forcing the leader to bow in the direction of its inherent curl and be inserted leading end portion first into the take-up chamber in response to closing movement of the camera back.

* * * * *